(12) United States Patent
Schneider (10) Patent No.: US 12,498,871 B2
(45) Date of Patent: Dec. 16, 2025

(54) STORAGE CONTROLLER AND A METHOD FOR IMPROVED MEMORY HANDLING

(71) Applicant: HUAWEI TECHNOLOGIES CO., LTD., Shenzhen (CN)

(72) Inventor: Zvi Schneider, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/666,529

(22) Filed: May 16, 2024

(65) Prior Publication Data

US 2024/0302987 A1 Sep. 12, 2024

Related U.S. Application Data

(63) Continuation of application No. PCT/EP2021/081851, filed on Nov. 16, 2021.

(51) Int. Cl.
*G06F 3/06* (2006.01)

(52) U.S. Cl.
CPC .......... *G06F 3/0647* (2013.01); *G06F 3/0604* (2013.01); *G06F 3/0659* (2013.01); *G06F 3/0673* (2013.01)

(58) Field of Classification Search
CPC .... G06F 3/0604; G06F 3/0605; G06F 3/0647; G06F 3/0649; G06F 3/0652; G06F 3/0659; G06F 3/0673; G06F 3/0685
See application file for complete search history.

(56) References Cited

U.S. PATENT DOCUMENTS

| | | | |
|---|---|---|---|
| 10,176,212 B1 | 1/2019 | Prohofsky | |
| 11,086,553 B1 | 8/2021 | Fisher | |
| 2017/0024161 A1 | 1/2017 | Katiyar et al. | |
| 2018/0181494 A1* | 6/2018 | Malladi | G06F 12/0811 |
| 2020/0042618 A1 | 2/2020 | Mukku et al. | |

* cited by examiner

*Primary Examiner* — Yong J Choe
(74) *Attorney, Agent, or Firm* — Leydig, Voit & Mayer, Ltd.

(57) ABSTRACT

A storage controller controls a storage memory where the storage memory includes at least one first tier memory and at least one second tier memory. The first tier memory has a higher access speed than the second tier memory. The storage memory is being arranged to store memory blocks of data grouped in memory chunks associated with an index. A memory chunk indicates the size of a memory operation. The storage controller is configured to determine that a memory chunk is to be moved from the first tier memory to the second tier memory, and write the memory chunk to the second tier memory. The storage controller is configured to receive a read request for the memory chunk and in response thereto determine that the memory chunk is current in the first tier memory, and read the memory chunk from the first tier memory.

21 Claims, 9 Drawing Sheets

STORAGE CONTROLLER AND A METHOD FOR IMPROVED MEMORY HANDLING

CROSS-REFERENCE TO RELATED APPLICATIONS

This application is a continuation of International Application No. PCT/EP2021/081851, filed on Nov. 16, 2021, the disclosure of which is hereby incorporated by reference in its entirety.

FIELD

The disclosure relates generally to memory handling, and more particularly, the disclosure relates to a storage controller and a method for improved memory handling.

BACKGROUND

Data tiering allows the movement of data between different storage tiers, which allows an organization to ensure that the appropriate data resides on the appropriate storage technology. Tiering algorithms are typically used to reduce the overall traffic between the storage tiers. In order to reduce the overall traffic between the storage tiers, it is important to minimize the number of movements of data and to avoid the back and forth problem.

For moving of data (i.e. tiering up\down) between the storage tiers, the data has to be moved first from a first storage tier to a second storage tier. If the movement of data is wrong, then the data will be moved back to the first storage tier. Existing approach of moving data may focus on making a very accurate decision on moving which data to which tier. However, this approach may not allow moving back to avoid repeated moves. Thus, it is very important to have a more flexible decision-making algorithm with a more accurate cost function. Key aspect of tier cost is the raw to usable ratio. The higher the raw to usable ratio is the lower the tier cost. The key points that drive the raw to usable ratio are over-provisioning (OP), rebuild spare (RS), and system reserved. The over provisioning (OP) is performed to control write amplification (WA), especially in log structured arrays. The rebuild spare (RS) is a capacity reserved for rebuild (e.g. usually at least the capacity of 1 drive). The system reserved is relatively a small portion and it includes metadata (MD) space and other system-related reserved. In some existing systems, the OP and RS range from 10% of the capacity to 50%. However, the key challenge is how to reduce and minimize the OP & RS cost, especially in the higher tiers where the media cost is by 4+ factor cost.

RAID is a storage virtualization technology that stores and replicates data in a storage. In a raid stripe or a chunk group (CKG) stripe, an element/data can be in one of the following states: T (Taken), F (Free), and NIP (Not In Parity). In the raid stripe or the chunk group (CKG) stripe, the T element is occupied and pointed by the storage tier's metadata (MD) layer, and this T element is a part of the parity calculation. The F element is not occupied and is not pointed by the storage tier's MD layer, but this F element is part of the parity calculation, and hence it is needed for rebuild and but cannot be overwritten. The NIP element is not occupied and is not pointed by the storage tier's MD layer, and this element is not part of the parity calculation, and hence it is not needed for rebuild and but can be overwritten. For example, when a data/element (e.g. $LBA_k$ is a taken data) is overwritten\moved\trimmed, the offset of the taken data is first marked as free because other taken data/element in the CKG stripe depends on this free data, in case of rebuild. The offset in the CKG stripe previously holding data of $LBA_k$ is marked as free, but the data is still needed for the rebuild in case of failure and it is part of the parity calculation.

In a log structured array/storage, a new write is always performed to an empty chunk group (CKG). A garbage collecting (GC) process or a flow is required to handle the valid data in the CKG before it is considered empty to be used for write. The distribution of "overwrite" & "trim+write" over the chunk group/address space in steady state effects directly the emptiness of the free stripe and as a result of the write amplification (WA). In this GC process, an empty CKG is prepared for a new write. If the empty CKG is ready for the new write, the new data that is still valid in the CKG is merged and rewritten. The GC process introduces a high cost of the write amplification. In order to reduce this high cost, existing log structured array/storage based systems have over provisioning (OP) of 50-10% of the storage tier capacity and a reserve capacity for rebuild. In such existing systems, this may also affect the utilization raw to usable. Alternatively, the GC process is performed inline with a write process. If a user organizes a new data to write, the existing system selects the CKG to GC, reads the valid data in it, packs the data, appends the new data. The existing system writes it to an empty CKG that exists for every writer thread. This approach is preferred when the system has constant load, or in "emergency cases" when the GC process is not available to supply empty stripes in time.

Time To Wipe (TTW) is an average time from the moment that a data/block is marked as free until it's CKG is being overwritten. The TTW depends on the workload types and the GC processes. For random workload with even distribution of overwrites (re) and raw raw capacity), OP and utilization U is as follows:

$$TTW_{re} \geq \frac{1}{2} * \frac{(\text{Raw} * Op + (\text{Raw} * (1 - Op)) * (1 - U))}{\#\text{avg\_written\_capacity\_per\_sec}}$$

Table 1 shows under different configurations of how much time (TTW) or how much capacity (TB) needs to be written to the system before the data is overwritten.

TABLE 1

| Raw (TB) | Over Provisioning (OP) | Utilization (U) | Max writes K | block size KB | User Write Time factor | TTW re (hours) | W Capacity to Wipe (TB) |
|---|---|---|---|---|---|---|---|
| 500 | 0.2 | 0.8 | 400 | 8 | 0.2 | 83.88608 | 180 |
| 100 | 0.3 | 0.9 | 400 | 8 | 0.2 | 17.24325 | 37 |
| 40 | 0.2 | 0.8 | 400 | 8 | 0.2 | 13.42177 | 14.4 |
| 14 | 0.35 | 0.9 | 400 | 8 | 0.2 | 2.707656 | 5.81 |

Typically, when the tiering algorithm decides to move some data blocks between storage tiers, the data blocks are written to a new tier and afterwards marked as free as like user data that is overwritten. Sometimes, in existing approaches, the tiering is combined with the GC flow. To move the data from one tier (e.g. a performance tier) to a target tier (e.g. a capacity tier), the system selects the data to be moved, writes the data to the target tier (i.e. insert data into the MD layer of the capacity tier), marks the offset as free in the performance tier and removes the data from the MD layer of the performance tier. The space of the moved data in the performance tier is free and the data is now in the capacity tier.

There are 2 common alternatives for marking free space to maintain stripe internal status. One alternative is to manage and hold a map with status for each segment. If the user wants to rely on this map, the map needs to be persisted. This is usually taken by systems that don't have back pointers from the stripe to a logical layer pointing to a reverse map. A big challenge is imposed when byte granular compression and packing is supported. The second alternative is to hold a percentage (%) taken in of each stripe. This requires much less metadata management, but introduces additional cost. In this approach, there is no status map in a memory, hence there is a need to build a status map in the memory on the fly by querying an index layer using the reverse map to see if the offset is still in use.

Therefore, there arises a need to address the aforementioned technical problem/drawbacks in reducing the overall traffic between the storage tiers.

SUMMARY

The present disclosure provides a storage controller controlling a storage memory and a method for use in the storage controller for controlling the storage memory to provide solutions to problems associated with conventional memory handling methods while also avoiding one or more disadvantages of prior art approaches.

According to a first aspect, there is provided a storage controller controlling a storage memory. The storage memory includes at least one first tier memory and at least one second tier memory. The first tier memory has a higher access speed than the second tier memory. The storage memory is being arranged to store memory blocks of data grouped in memory chunks associated with an index. A memory chunk indicates the size of a memory operation. The storage controller is configured to determine that a respective memory chunk of the memory chunks is to be moved from the first tier memory to the second tier memory. The storage controller is configured to write the memory chunk to the second tier memory. The storage controller is configured to receive a read request for the memory chunk and in response thereto determine that the memory chunk is current in the first tier memory, and read the memory chunk from the first tier memory in response to determining that the memory chunk is current in the first tier memory.

The storage controller reduces cost of the first tier memory by translating over provisioning (OP) cost from the first tier memory (e.g. a high tier memory) to the second tier memory (e.g. a low tier memory). The storage controller reduces the first tier memory cost by translating a drive reserved capacity cost from the high/first tier memory to the low/second tier memory and improves latency. The storage controller supports near optimal data tiering. The storage controller reduces the data movement drastically during data tiering. The storage controller enables an improved selection of the data to a down/second tier memory by down tiering more than needed and using the time period until garbage collecting (GC) process is actually performed. The storage controller enables burst writes to the first tier memory and reduces tiering impact on a system. Because, usually the second tier memory has plenty of space, so a user can free up much more space in the first tier memory (i.e. a performance tier) without any impact, unless the first tier memory is actually used. The storage controller is equally applicable in case of tier down and up, and for several tiers. The storage controller reduces at least 10% of the cost of the performance tier/the first tier memory.

In an embodiment, the storage controller is further configured to count the memory chunk as free memory space in the first tier memory. In embodiments, the storage controller is further configured to receive a write request for the memory chunk and in response thereto determine that the memory chunk is not current in the first tier memory. In an embodiment, the storage controller is further configured to perform a garbage collecting process in a memory area where the memory chunk is stored in the first tier memory and in response thereto determine that the memory chunk is not current in the first tier memory.

In embodiments, the storage controller is further configured to determine that the memory chunk is to be moved from the second tier memory to the first tier memory and in response thereto: determine that the memory chunk is current in the first tier memory, and mark the memory chunk as being in the first tier memory in the index associated with the memory chunk in response to determining that the memory chunk is current in the first tier memory.

In an embodiment, the storage controller is further configured to store a flag indicating the status of the memory chunk in the index associated with the memory chunk. The storage controller may be configured to set a Q-flag in the flag indicating the status. The Q-flag may indicate that the memory chunk is in the second tier memory and also current in the first tier memory upon writing the memory chunk to the second tier memory. The storage controller may be configured to determine that the memory chunk is current in the first tier memory by determining whether the Q-flag is set or not. A F-flag may indicate that a memory area for the memory chunk is free. The storage controller may be configured to determine that the memory chunk is not current in the first tier memory by clearing the Q-flag. In an embodiment, the storage controller is further configured to set the F-flag indicating that the memory area for the memory chunk is free.

In embodiments, the storage controller is further configured to receive a delete wipe for the memory chunk in the first tier memory and in response thereto determine that the Q-flag is set, and wipe the memory chunk without writing the memory chunk to another memory area. The index associated with the memory chunk may be associated with the first tier memory.

According to a second aspect, there is provided a method for use in a storage controller controlling a storage memory. The storage memory includes at least one first tier memory and at least one second tier memory. The first tier memory has a higher access speed than the second tier memory. The storage memory is being arranged to store memory blocks of data grouped in memory chunks associated with an index. A memory chunk indicates the size of a memory operation. The method includes determining that a respective memory chunk of the memory chunks is to be moved from the first tier memory to the second tier memory. The method includes writing the memory chunk to the second tier memory. The method includes receiving a read request for the memory chunk and in response thereto determining that the memory chunk is current in the first tier memory, and reading the memory chunk from the first tier memory in response to determining that the memory chunk is current in the first tier memory.

The method reduces cost of the first tier memory by translating over provisioning (OP) cost from the first tier memory (e.g. a high tier memory) to the second tier memory (e.g. a low tier memory). The method reduces the first tier memory cost by translating a drive reserved capacity cost from the high/first tier memory to the low/second tier memory and improves latency. The method supports near optimal data tiering. The method reduces the data movement drastically during data tiering. The method enables an improved selection of the data to a down/second tier memory by down tiering more than needed and using the time period until garbage collecting (GC) process is actually performed. The method enables burst writes to the first tier memory and reduces tiering impact on a system. Because, usually the second tier memory has plenty of space, so a user can free up much more space in the first tier memory (i.e. a performance tier) without any impact, unless the first tier memory is actually used. The method is equally applicable in case of tier down and up, and for several tiers. The method reduces at least 10% of the cost of the performance tier/the first tier memory.

In an embodiment, the method further includes counting the memory chunk as free memory space in the first tier memory. In embodiments, the method further includes receiving a write request for the memory chunk and in response thereto determining that the memory chunk is not current in the first tier memory. In an embodiment, the method further includes performing a garbage collecting process in a memory area where the memory chunk is stored in the first tier memory and in response thereto determine that the memory chunk is not current in the first tier memory.

In embodiments, the method further includes determining that the memory chunk is to be moved from the second tier memory to the first tier memory and in response thereto: determining that the memory chunk is current in the first tier memory, and marking the memory chunk as being in the first tier memory in the index associated with the memory chunk in response to determining that the memory chunk is current in the first tier memory.

In an embodiment, the method further includes (i) storing a flag indicating the status of the memory chunk in the index associated with the memory chunk, (ii) setting a Q-flag in the flag indicating the status, the Q-flag indicating that the memory chunk is in the second tier memory and also current in the first tier memory upon writing the memory chunk to the second tier memory, and (iii) determining that the memory chunk is current in the first tier memory by determining whether the Q-flag is set or not. A F-flag may indicate that the memory area for the memory chunk is free. The method further may include determining that the memory chunk is not current in the first tier memory by clearing the Q-flag. In an embodiment, the method further includes setting the F-flag indicating that the memory area for the memory chunk is free.

In embodiments, the method further includes receiving a delete wipe for the memory chunk in the first tier memory and in response thereto: determining that the Q-flag is set, and wiping the memory chunk without writing the memory chunk to another memory area. The index associated with the memory chunk may be associated with the first tier memory.

According to a third aspect, there is provided a computer-readable medium carrying computer instructions that when loaded into and executed by a storage controller enables the storage controller to implement the above method.

Therefore, in contradistinction to the existing solutions, the storage controller reduces first tier memory cost by translating over provisioning (OP) cost from the first tier memory (e.g. a high tier memory) to the second tier memory (e.g. a low tier memory). The storage controller reduces the cost of the first tier memory by translating a drive reserved capacity cost from the high/first tier memory to the low/second tier memory and improves latency. The storage controller supports near optimal data tiering. The storage controller reduces the data movement drastically during data tiering. The storage controller enables an improved selection of the data to a down/second tier memory by down tiering more than needed and using the time period until garbage collecting (GC) process is actually performed. The storage controller enables burst writes to the first tier memory and reduces tiering impact on a system. Because, usually the second tier memory has plenty of space, so a user can free up much more space in the first tier memory (i.e. a performance tier) without any impact, unless the first tier memory is actually used. The storage controller is equally applicable in case of tier down and up, and for several tiers. The storage controller reduces at least 10% of the cost of the performance tier/the first tier memory.

These and other aspects of the present disclosure will be apparent from and the implementation(s) described below.

BRIEF DESCRIPTION OF DRAWINGS

Implementations of the disclosure will now be described, by way of example only, with reference to the accompanying drawings, in which.

DETAILED DESCRIPTION

Implementations of the present disclosure provide a storage controller controlling a storage memory and a method for use in the storage controller for controlling the storage memory.

To make solutions of the present disclosure more comprehensible for a person skilled in the art, the following implementations of the present disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the embodiments of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
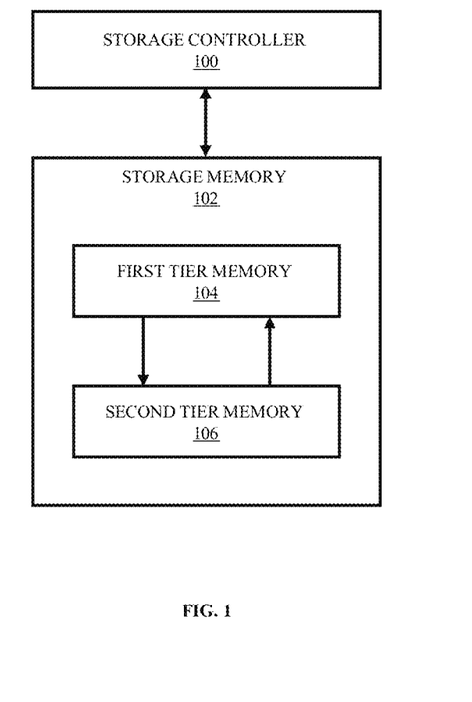
FIG. 1 is a block diagram of a storage controller controlling a storage memory in accordance with an implementation of the present disclosure.

FIG. 1 is a block diagram of a storage controller 100 controlling a storage memory 102 in accordance with an implementation of the present disclosure. The storage memory 102 includes at least one first tier memory 104 and at least one second tier memory 106. The first tier memory 104 has a higher access speed than the second tier memory 106. The storage memory 102 is being arranged to store memory blocks of data grouped in memory chunks associated with an index. A memory chunk indicates the size of a memory operation. The storage controller 100 is configured to determine that a memory chunk is to be moved from the first tier memory 104 to the second tier memory 106. The storage controller 100 is configured to write the memory chunk to the second tier memory 106. The storage controller 100 is configured to receive a read request for the memory chunk and in response thereto determine that the memory chunk is current in the first tier memory 104, and read the memory chunk from the first tier memory 104.

The storage controller 100 reduces cost of the first tier memory 104 by translating over provisioning (OP) cost from the first tier memory 104 (e.g. a high tier memory) to the second tier memory 106 (e.g. a low tier memory). The storage controller 100 reduces the cost of the first tier memory 104 by translating a drive reserved capacity cost from the high/first tier memory 104 to the low/second tier memory 106 and improves latency. The storage controller 100 supports near optimal data tiering. The storage controller 100 reduces the data movement drastically during data tiering. The storage controller 100 enables an improved selection of the data to a down/second tier memory 106 by down tiering more than needed and using the time period until garbage collecting (GC) process is actually performed. The storage controller 100 enables burst writes to the first tier memory 104 and reduces tiering impact on a system. Because, usually the second tier memory 106 has plenty of space, so a user can free up much more space in the first tier memory 104 (i.e. a performance tier) without any impact, unless the first tier memory 104 is actually used. The storage controller 100 is equally applicable in case of tier down and up, and for several tiers. The storage controller 100 reduces at least 10% of the cost of the performance tier/the first tier memory 104.

In an embodiment, the storage controller 100 writes to both the tiers (i.e. the first tier memory 104 and the second tier memory 106) from the beginning and eliminates the data from the first tier memory 104/the performance tier memory 104 only when it is actually needed for a new write. The storage controller 100 may continue using the space during the time period after the tier-moved the data (i.e. moved data between different tiers) until the offset is actually being trimmed or overwritten on a drive using a garbage collecting (GC) process or a write. This time period is defined as a Time To Wipe (TTW). The Time To Wipe (TTW) is an average time from the moment that a memory chunk is marked as free (a F-flag) until that memory chunk is being overwritten. The F-flag may indicate that the memory area for the memory chunk is free. In an embodiment, the storage controller 100 is further configured to set the F-flag indicating that the memory area for the memory chunk is free.

In embodiments, the storage controller 100 is further configured to count the memory chunk as free memory space in the first tier memory 104. In an embodiment, the storage controller 100 is further configured to receive a write request for the memory chunk and in response thereto determine that the memory chunk is not current in the first tier memory 104. Optionally, the storage controller 100 is further configured to perform a garbage collecting process in a memory area where the memory chunk is stored in the first tier memory 104 and in response thereto determine that the memory chunk is not current in the first tier memory 104.

In an embodiment, the storage controller 100 is further configured to determine that the memory chunk is to be moved from the second tier memory 106 to the first tier memory 104 and in response thereto determine that the memory chunk is current in the first tier memory 104, and mark the memory chunk as being in the first tier memory 104 in the index associated with the memory chunk. The index associated with the memory chunk may be associated with the first tier memory 104.

For example, a memory chunk B (e.g. a logical chunk in a user address space) is located initially at the first tier memory 104/the performance tier memory (e.g. a $\text{Tier}_{perf}$) in the storage memory 102/a chunk group (CKG) stripe as CKG $d_1$ to CKG $d_N$. For example, $d_1$ to $d_N$ are memory chunks. In an embodiment, the second tier memory 106 is a capacity tier memory (e.g. $\text{Tier}_{cap}$). In embodiments, the storage controller 100 is configured to move the memory chunk B from the $\text{Tier}_{perf}$ down to the $\text{Tier}_{cap}$ using a tier down algorithm. In an embodiment, the storage controller 100 is configured to write the memory chunk B to the $\text{Tier}_{cap}$ (i.e. adding the memory chunk B and its associated index/metadata to the $\text{Tier}_{cap}$). In embodiments, the storage controller 100 is configured to mark the space in the $\text{Tier}_{perf}$ as free (i.e. set the F-flag for the free space). In an embodiment, the storage controller 100 is configured to mark in the storage memory 102/the chunk group (CKG) stripe that this entry may be overwritten (using a Q-flag). A utilization level of CKG $d_1$ to CKG $d_N$ is updated as if the memory chunk B is deleted. The $\text{TTW}_{d1}$ may be the time until the GC overwrites $d_1$ or a new write overwrite d1 (and same for all i≤n). If a read for the memory chunk B arrives during $\text{TTW}_{di}$ (i.e. if the memory chunk B is still located in CKG $d_i$), then the storage controller 100 reads from $\text{Tier}_{perf}$.

In embodiments, the storage controller 100 is configured to move the memory chunk B from the $\text{Tier}_{cap}$ up to the $\text{Tier}_{perf}$. If during $\text{TTW}_{d1}$ time, due to an activity (e.g. from hotness to a new read, or due to change in utilization of the $\text{Tier}_{perf}$) on the memory chunk B or a subset of offsets in the memory chunk B, the storage controller 100 may decide to move up tier memory. In an embodiment, the storage controller 100 moves the memory chunk B up again due to the memory chunk B being read active again. In this case, if the Q flag is on, the storage controller 100 may mark this memory chunk B as not free and also clear the Q flag, i.e. the data is moved back to the performance tier memory without the need to read it from the capacity tier memory (i.e. a cold tier memory) and write it again to the performance tier memory (i.e. a hot tier memory). In embodiments, the storage controller 100 is configured to clear the Q-flag and update the utilization back. The storage controller 100 may be configured to mark the $Tier_{cap}$ as Q-flag and update the $Tier_{cap}$ utilization. In an embodiment, the storage controller 100 is configured to move the memory chunk B from the $Tier_{cap}$ up to the $Tier_{perf}$, thus there is no need to write the memory chunk B or its metadata to the $Tier_{perf}$. If no change is made during that time, the GC process occurs and an entry is deleted from the metadata of the $Tier_{perf}$ and the Q-flag is cleared. When selecting the CKG to the GC, the storage controller 100 may prefer the CKG's with overwritten\deleted data and not with data that is down tiered.

Figure 2:
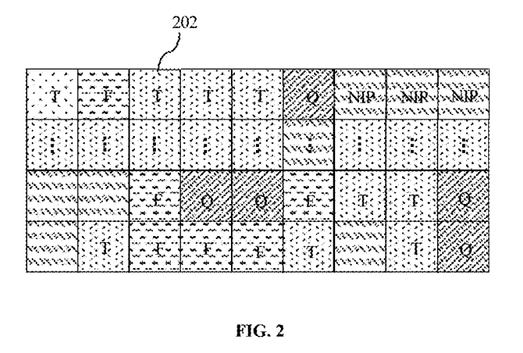
FIG. 2 is an exemplary illustration of a storage memory or a chunk group (CKG) stripe in accordance with an implementation of the present disclosure.

FIG. 2 is an exemplary illustration of a storage memory or a chunk group (CKG) stripe 202 in accordance with an embodiment of the present disclosure. In an embodiment, a storage controller is further configured to store a flag indicating the status of a memory chunk in the index associated with the memory chunk. The storage controller may be configured to set a Q-flag in the flag indicating the status. The Q-flag may indicate that the memory chunk is in a second tier memory and also current in a first tier memory upon writing the memory chunk to the second tier memory. The storage controller may be configured to determine whether the memory chunk is current in the first tier memory by determining whether the Q-flag is set or not. A F-flag may indicate that a memory area for the memory chunk is free. In embodiments, the storage controller is further configured to set the F-flag indicating that the memory area for the memory chunk is free. In an embodiment, each segment in the storage memory or the chunk group (CKG) stripe 202 includes one of the following states: T (Taken (in parity)), F (Free (in parity)), Q (2 copies of a memory chunk (in parity)), and NIP (Not in parity). The NIP state may be p1, p2, and p3, etc. In embodiments, if the status of the memory chunk is in the Q-flag, then it means that the memory chunk may be appearing in more than one tier (i.e. in the first tier memory and the second tier memory). In an alternate approach, the Q-flag may be added to existing flags (i.e. the F-flag and a NIP flag) if the memory chunk associated with the index is pointed by a current tier memory (i.e. if the memory chunk is in the first tier memory) and the memory chunk exists in the other tier memory (i.e. the second tier memory). In an embodiment, the storage controller is further configured to receive a delete wipe for the memory chunk in the first tier memory and in response thereto determine if the Q-flag is set, and if so, wipe the memory chunk without writing the memory chunk to another memory area. In embodiments, the Q-flag marked memory chunk can be wiped without writing it to a new location by a GC process, a write, or a move. The Q-flag marked memory chunk is protected and is valid like any other memory chunks in the storage memory. The Q-flag marked memory chunk may be counted for used capacity only once even if the Q-flag marked memory chunk appears 2 times (i.e. in the first tier memory and the second tier memory). The storage controller may be configured to determine that the memory chunk is not current in the first tier memory by clearing the Q-flag. The Q-flag marked memory chunk may be cleared and no additional operation needs to be performed in the current tier memory. In an embodiment, the Q-flag marked memory chunk may be deleted from the other tier (i.e. the second tier memory). An entry may be in the Q-flag which is then used for calculating TTW time.

Figure 3A:
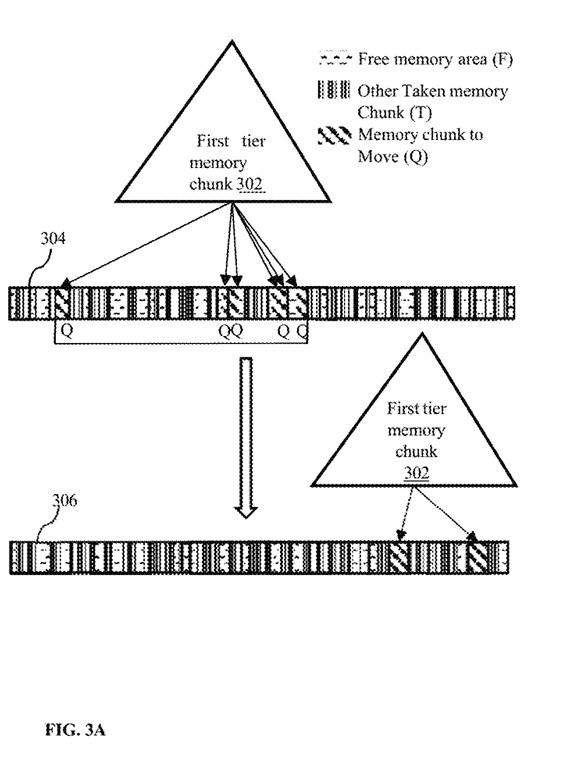
FIGS. 3A-3C illustrate two phases of data movement during up/down tiering in a storage memory in accordance with an implementation of the present disclosure.
Figure 3B:
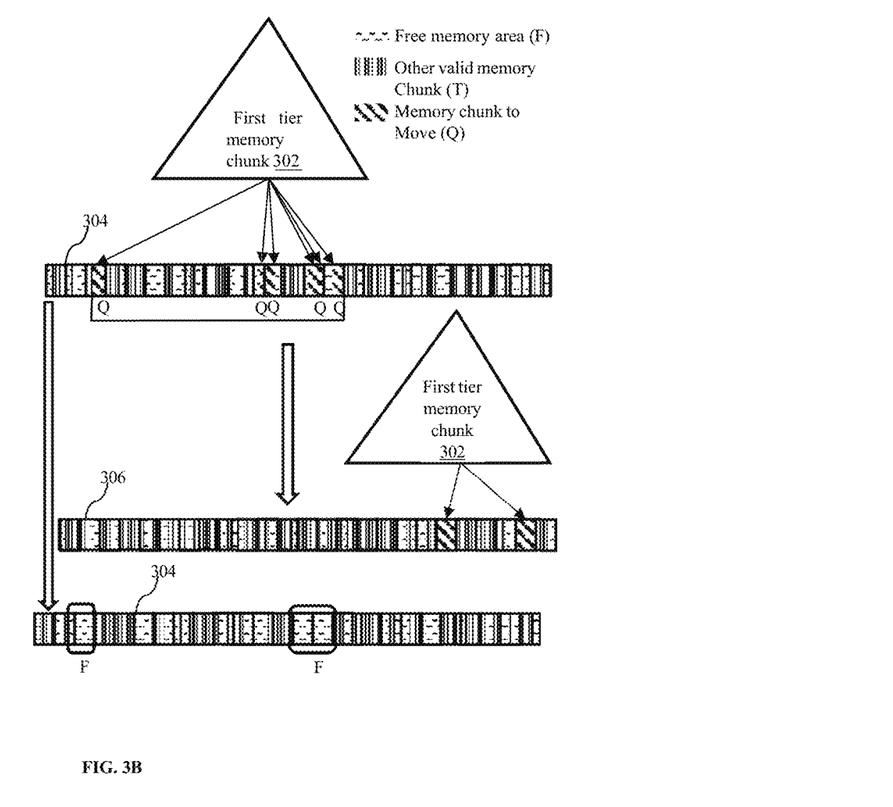
Figure 3C:
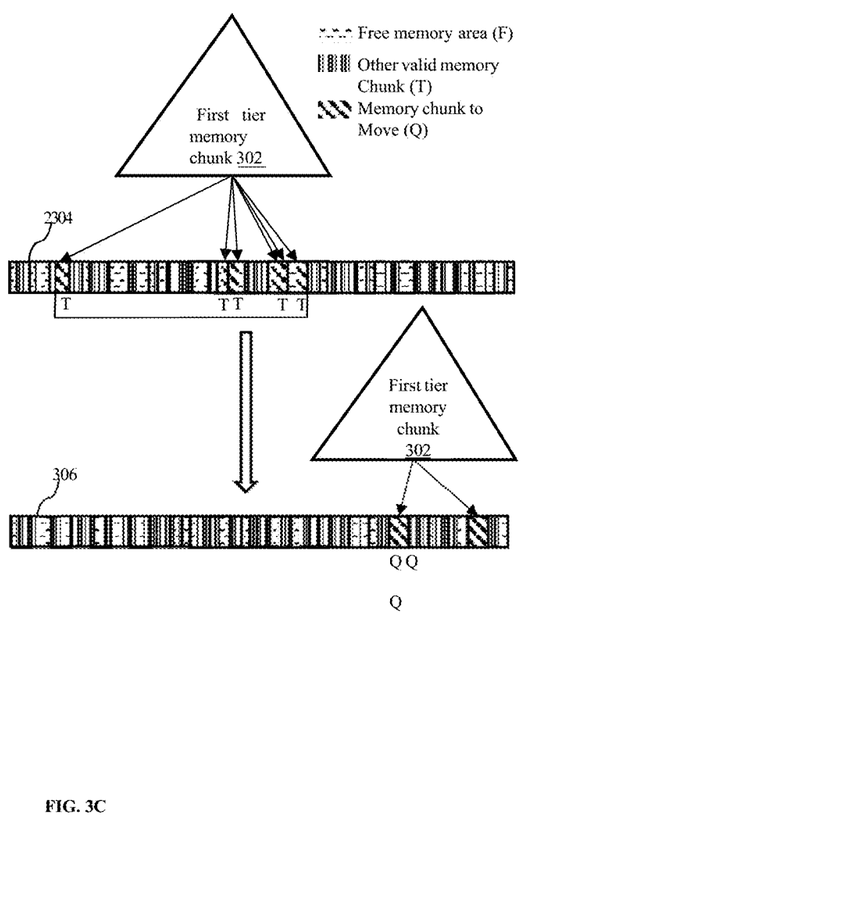

FIGS. 3A-3C illustrate two phases of data/memory chunk movement during up/down tiering in a storage memory in accordance with an implementation of the present disclosure. The storage memory includes at least one first tier memory 304 and at least one second tier memory 306. For example, a movement of a memory chunk (down\up) is determined in 2-phases. FIGS. 3A-3C depict that a first tier memory chunk 302 is selected for movement. The movement of the first tier memory chunk 302 may be down tiering or up tiering. In an embodiment, the down tiering is the movement of the memory chunk from the first tier memory 304 or a performance tier memory (e.g. a $Tier_{source}$) to the second tier memory 306 or a capacity tier memory (e.g. a $Tier_{target}$). In an embodiment, the up tiering is the movement of the memory chunk from the second tier memory 306 or the capacity tier memory to the first tier memory 304 or the performance tier memory. FIG. 3A shows that the first tier memory chunk 302 (e.g. a $block_A$) moves from the first tier memory 304 ($Tier_{source}$) to the second tier memory 306 ($Tier_{target}$). In embodiments, a storage controller writes the first tier memory chunk 302 (i.e. data and metadata) to the second tier memory 306 or the capacity tier memory ($Tier_{target}$). The storage controller may mark/set the first tier memory chunk 302 as a Q-flag in the first tier memory 304 or the performance tier memory ($Tier_{source}$).

As shown in FIG. 3B, if there is a garbage collection or overwrite to a memory chunk/an area with a value Q (i.e. a Q-flag), the storage controller may overwrite or delete it as the data is in the capacity tier memory (i.e. a lower tier). As shown in FIG. 3C, if there are reads to a memory chunk/an area with value Q (i.e. a Q-flag), than the storage controller may decide to tier up, and in this case, the storage controller may delete the data from the capacity tier memory (i.e. the lower tier), and mark the data as value T (i.e. a T-flag) instead of the value Q (i.e. the Q-flag) in the performance tier memory (i.e. a high tier).

Figure 4A:
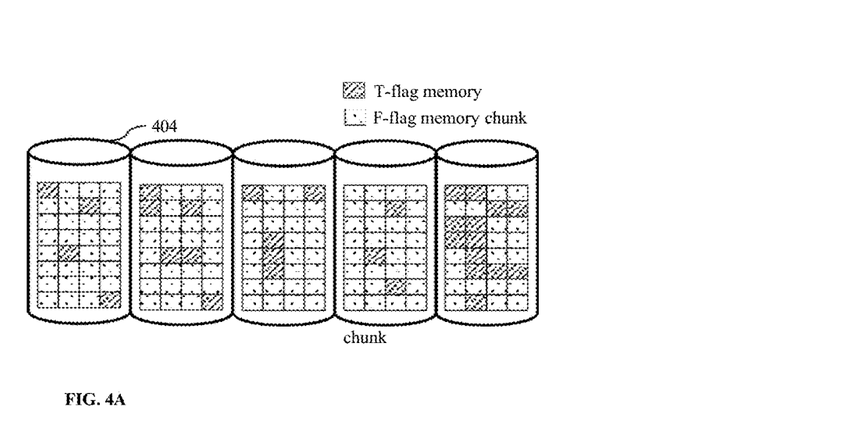
FIGS. 4A-4C are schematic illustrations that depict utilization of a reserved space for rebuild in a first tier memory in accordance with an implementation of the present disclosure.
Figure 4B:
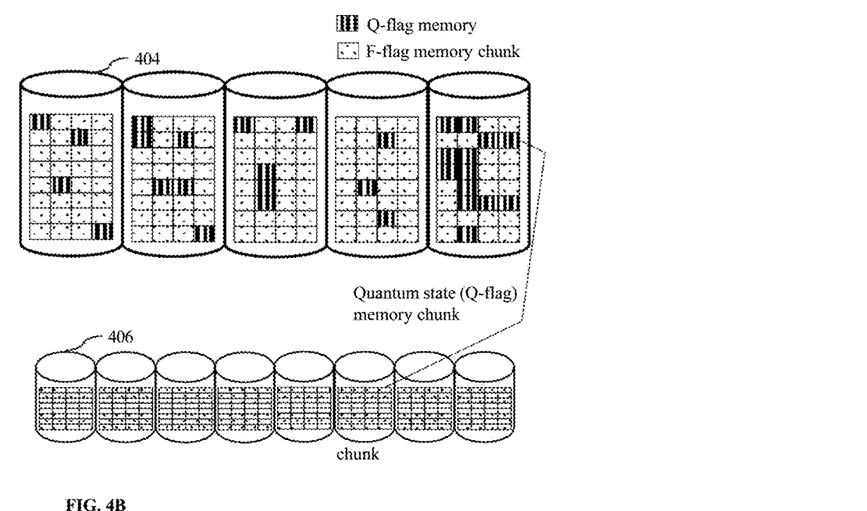
Figure 4C:
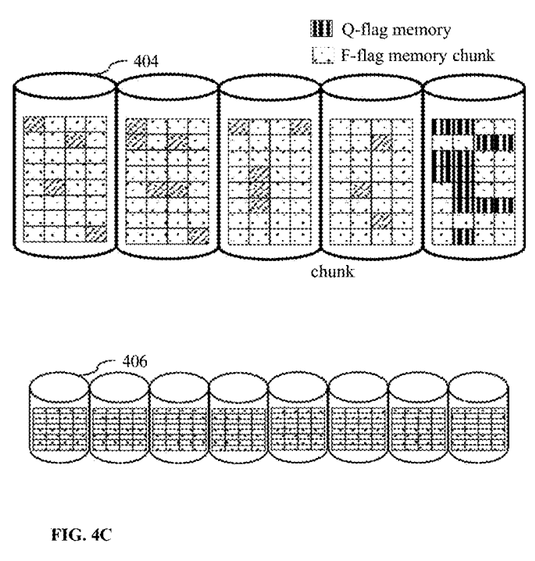

FIGS. 4A-4C are schematic illustrations that depict utilization of a reserved space for rebuild in a first tier memory 404 in accordance with an implementation of the present disclosure. FIG. 4A shows that a capacity/space of a spare drive is reserved in the first tier memory 404 (i.e. a performance tier memory) to support rebuild at a later stage. In an embodiment, the space of the spare drive includes a taken memory chunk/data (T-flag) and a free memory chunk/data (F-flag). The space of the spare drive is reduced from a usable capacity. FIG. 4B shows that a space/capacity designated for the rebuild is utilized while still supporting the rebuild in the first tier memory 404. Here, data/memory chunks may appear both in a second tier memory 406 (i.e. a capacity tier memory) and the first tier memory 404 (i.e. the performance tier memory), but it may be read from the first tier memory 404. Thus, the memory chunks that appear in the second tier memory 406 can be removed from the first tier memory 404 without any write, and the spare drive is not reduced from the capacity of the first tier memory 404. FIG. 4C shows that when the rebuild needs to be performed due to a drive failure, a Q marked memory chunk in the failed drive may be immediately discarded, without re-writing it anywhere as it exists in the second tier memory 406/the capacity tier memory and the Q marked entries (e.g. memory chunks) in the other drives can be used as like in the GC or a write flow. This eliminates the need for a spare drive of the first tier memory 404/the performance tier memory which is more expensive than the performance tier memory/first tier memory 404 and requires only a space of that spare drive in the first tier memory 404/the capacity tier memory, which one fraction of the cost of the spare drive of the first tier memory 404.

Figure 5:
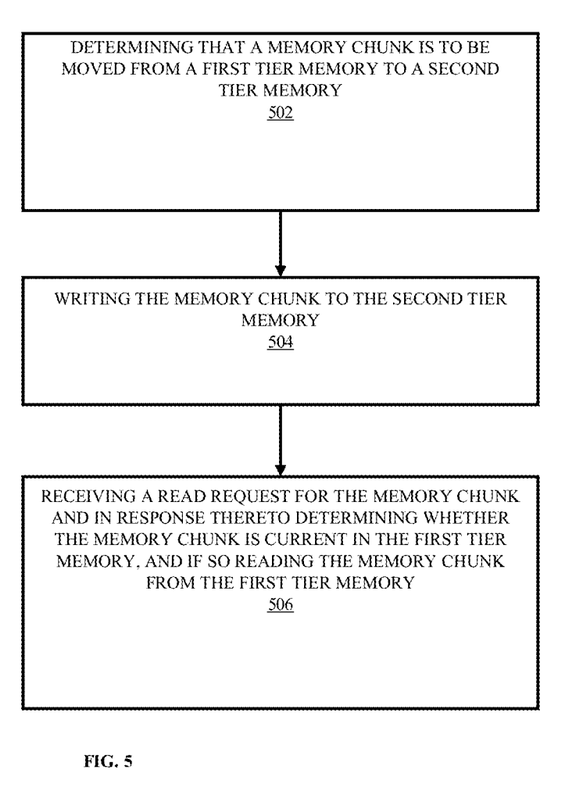
FIG. 5 is a flow diagram that illustrates a method for use in a storage controller controlling a storage memory in accordance with an implementation of the present disclosure.

FIG. 5 is a flow diagram that illustrates a method for use in a storage controller controlling a storage memory in accordance with an implementation of the present disclosure. The storage memory includes at least one first tier memory and at least one second tier memory. The first tier memory has a higher access speed than the second tier memory. The storage memory is being arranged to store memory blocks of data grouped in memory chunks associated with an index. A memory chunk indicates the size of a memory operation. At a step 502, it is determined that the memory chunk is to be moved from the first tier memory to the second tier memory. At a step 504, the memory chunk is written to the second tier memory. At a step 506, a read request for the memory chunk is received and in response thereto it is determined whether the memory chunk is current in the first tier memory, and if so the memory chunk is read from the first tier memory.

The method reduces cost of the first tier memory by translating over provisioning (OP) cost from the first tier memory (e.g. a high tier memory) to the second tier memory (e.g. a low tier memory). The method reduces the first tier memory cost by translating a drive reserved capacity cost from the high/first tier memory to the low/second tier memory and improves latency. The method supports near optimal data tiering. The method reduces the data movement drastically during data tiering. The method enables an improved selection of the data to a down/second tier memory by down tiering more than needed and using the time period until garbage collecting (GC) process is actually performed. The method enables burst writes to the first tier memory and reduces tiering impact on a system. Because, usually the second tier memory has plenty of space, so a user can free up much more space in the first tier memory (i.e. a performance tier) without any impact, unless the first tier memory is actually used. The method is equally applicable in case of tier down and up, and for several tiers. The method reduces at least 10% of the cost of the performance tier/the first tier memory.

In an embodiment, the method further includes counting the memory chunk as free memory space in the first tier memory. In embodiments, the method further includes receiving a write request for the memory chunk and in response thereto determining that the memory chunk is not current in the first tier memory. In an embodiment, the method further includes performing a garbage collecting process in a memory area where the memory chunk is stored in the first tier memory and in response thereto determine that the memory chunk is not current in the first tier memory.

In an embodiment, the method further includes determining that the memory chunk is to be moved from the second tier memory to the first tier memory and in response thereto determining whether the memory chunk is current in the first tier memory, and if so marking the memory chunk as being in the first tier memory in the index associated with the memory chunk.

In embodiments, the method further includes (i) storing a flag indicating the status of the memory chunk in the index associated with the memory chunk, (ii) setting a Q-flag in the flag indicating the status, where the Q-flag indicating that the memory chunk is in the second tier memory and also current in the first tier memory upon writing the memory chunk to the second tier memory, and (iii) determining whether the memory chunk is current in the first tier memory by determining whether the Q-flag is set or not. A F-flag may indicate that the memory area for the memory chunk is free. The method further may include determining that the memory chunk is not current in the first tier memory by clearing the Q-flag. In an embodiment, the method further includes setting the F-flag indicating that the memory area for the memory chunk is free.

In embodiments, the method further includes receiving a delete wipe for the memory chunk in the first tier memory and in response thereto determining if the Q-flag is set, and if so, wiping the memory chunk without writing the memory chunk to another memory area. The index associated with the memory chunk may be associated with the first tier memory.

In an embodiment, a computer-readable medium carrying computer instructions that when loaded into and executed by the above storage controller enables the storage controller to implement the above method.

Figure 6:
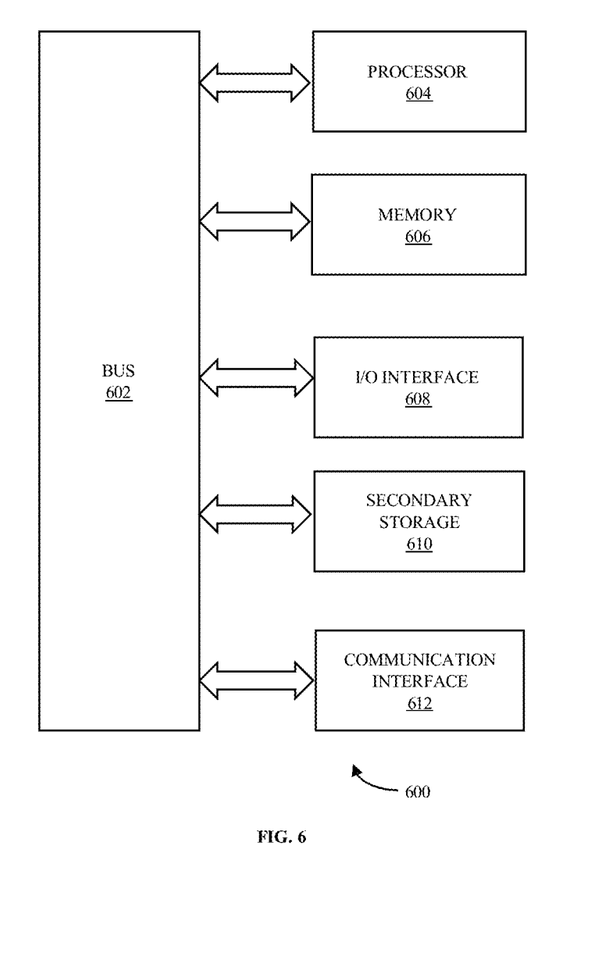
FIG. 6 is an illustration of a storage controller or a computer system in which the various architectures and functionalities of the various previous implementations may be implemented.

FIG. 6 is an illustration of a storage controller or a computer system in which the various architectures and functionalities of the various previous implementations may be implemented. As shown, the computer system 600 includes at least one processor 604 that is connected to a bus 602, wherein the computer system 600 may be implemented using any suitable protocol, such as PCI (Peripheral Component Interconnect), PCI-Express, AGP (Accelerated Graphics Port), Hyper Transport, or any other bus or point-to-point communication protocol (s). The computer system 600 also includes a memory 606.

Control logic (software) and data are stored in the memory 606 which may take a form of random-access memory (RAM). In the disclosure, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 600 may also include a secondary storage 610. The secondary storage 610 includes, for example, a hard disk drive and a removable storage drive, representing a floppy disk drive, a magnetic tape drive, a compact disk drive, digital versatile disk (DVD) drive, recording device, universal serial bus (USB) flash memory. The removable storage drive at least one of reads from and writes to a removable storage unit in a well-known manner.

Computer programs, or computer control logic algorithms, may be stored in at least one of the memory 606 and the secondary storage 610. Such computer programs, when executed, enable the computer system 600 to perform various functions as described in the foregoing. The memory 606, the secondary storage 610, and any other storage are possible examples of computer-readable media.

In an implementation, the architectures and functionalities depicted in the various previous figures may be implemented in the context of the processor 604, a graphics processor coupled to a communication interface 612, an integrated circuit (not shown) that is capable of at least a portion of the capabilities of both the processor 604 and a graphics processor, a chipset (namely, a group of integrated circuits designed to work and sold as a unit for performing related functions, and so forth).

Furthermore, the architectures and functionalities depicted in the various previous-described figures may be implemented in a context of a general computer system, a circuit board system, a game console system dedicated for entertainment purposes, an application-specific system. For example, the computer system 600 may take the form of a desktop computer, a laptop computer, a server, a workstation, a game console, an embedded system.

Furthermore, the computer system 600 may take the form of various other devices including, but not limited to a personal digital assistant (PDA) device, a mobile phone device, a smart phone, a television, and so forth. Additionally, although not shown, the computer system 600 may be coupled to a network (for example, a telecommunications network, a local area network (LAN), a wireless network, a wide area network (WAN) such as the Internet, a peer-to-peer network, a cable network, or the like) for communication purposes through an I/O interface 608.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

What is claimed is:

1. A storage controller controlling a storage memory, wherein the storage memory comprises at least one first tier memory and at least one second tier memory, wherein the first tier memory has a higher access speed than the second tier memory, the storage memory being arranged to store memory blocks of data grouped in memory chunks associated with an index, wherein a memory chunk indicates the size of a memory operation, wherein the storage controller is configured to:
   determine that a respective memory chunk of the memory chunks is to be moved from the first tier memory to the second tier memory;
   write the memory chunk to the second tier memory;
   receive a read request for the memory chunk and in response thereto:
     determine that the memory chunk is current in the first tier memory; and
     read the memory chunk from the first tier memory in response to determining that the memory chunk is current in the first tier memory;
   determine that the memory chunk is to be moved from the second tier memory to the first tier memory and in response thereto:
     determine that the memory chunk is current in the first tier memory; and
     mark the memory chunk as being in the first tier memory in the index associated with the memory chunk in response to determining that the memory chunk is current in the first tier memory.

2. The storage controller according to claim 1, wherein the storage controller is further configured to:
   count the memory chunk as free memory space in the first tier memory.

3. The storage controller according to claim 1, wherein the storage controller is further configured to:
   receive a write request for the memory chunk and in response thereto determine that the memory chunk is not current in the first tier memory.

4. The storage controller according claim 1, wherein the storage controller is further configured to:
   perform a garbage collecting process in a memory area where the memory chunk is stored in the first tier memory and in response thereto determine that the memory chunk is not current in the first tier memory.

5. The storage controller according to claim 1, wherein the storage controller is further configured to:
   store a flag indicating the status of the memory chunk in the index associated with the memory chunk;
   set a Q-flag in the flag indicating the status, the Q-flag indicating that the memory chunk is in the second tier memory and also current in the first tier memory upon writing the memory chunk to the second tier memory; and
   determine that the memory chunk is current in the first tier memory by determining whether the Q-flag is set or not.

6. The storage controller according to claim 5, wherein a F-flag indicates that a memory area for the memory chunk is free.

7. The storage controller according to claim 5, wherein the storage controller is further configured to determine that the memory chunk is not current in the first tier memory by clearing the Q-flag.

8. The storage controller according to claim 6, wherein the storage controller is further configured to set the F-flag indicating that the memory area for the memory chunk is free.

9. The storage controller according to claim 5, wherein the storage controller is further configured to:
   receive a delete wipe for the memory chunk in the first tier memory and in response thereto:
     determine that the Q-flag is set; and
     wipe the memory chunk without writing the memory chunk to another memory area.

10. The storage controller according to claim 1, wherein the index associated with the memory chunk is associated with the first tier memory.

11. A method for use in a storage controller controlling a storage memory, wherein the storage memory comprises at least one first tier memory and at least one second tier memory, wherein the first tier memory has a higher access speed than the second tier memory, the storage memory being arranged to store memory blocks of data grouped in memory chunks associated with an index, wherein a memory chunk indicates the size of a memory operation, wherein the method comprises:
   determining that a respective memory chunk of the memory chunks is to be moved from the first tier memory to the second tier memory;
   writing the memory chunk to the second tier memory;
   receiving a read request for the memory chunk and in response thereto:
     determining that the memory chunk is current in the first tier memory; and
     reading the memory chunk from the first tier memory in response to determining that the memory chunk is current in the first tier memory;
   determining that the memory chunk is to be moved from the second tier memory to the first tier memory and in response thereto:

determining that the memory chunk is current in the first tier memory; and marking the memory chunk as being in the first tier memory in the index associated with the memory chunk in response to determining that the memory chunk is current in the first tier memory.

12. The method according to claim 11, wherein the method further comprises:

counting the memory chunk as free memory space in the first tier memory.

13. The method according to claim 11, wherein the method further comprises:

receiving a write request for the memory chunk and in response thereto determining that the memory chunk is not current in the first tier memory.

14. The method according to claim 11, wherein the method further comprises:

performing a garbage collecting process in a memory area where the memory chunk is stored in the first tier memory and in response thereto determine that the memory chunk is not current in the first tier memory.

15. The method according to claim 11, wherein the method further comprises:

storing a flag indicating the status of the memory chunk in the index associated with the memory chunk;

setting a Q-flag in the flag indicating the status, the Q-flag indicating that the memory chunk is in the second tier memory and also current in the first tier memory upon writing the memory chunk to the second tier memory; and determining that the memory chunk is current in the first tier memory by determining whether the Q-flag is set or not.

16. The method according to claim 15, wherein a F-flag indicates that a memory area for the memory chunk is free.

17. The method according to claim 15, wherein the method further comprises determining that the memory chunk is not current in the first tier memory by clearing the Q-flag.

18. The method according to claim 16, wherein the method further comprises setting the F-flag indicating that the memory area for the memory chunk is free.

19. The method according to claim 15, wherein the method further comprises:

receiving a delete wipe for the memory chunk in the first tier memory and in response thereto:

determining that the Q-flag is set; and wiping the memory chunk without writing the memory chunk to another memory area.

20. The method according to claim 11, wherein the index associated with the memory chunk is associated with the first tier memory.

21. A computer-readable medium carrying computer instructions that when loaded into and executed by a storage controller enables the storage controller to implement the method according to claim 11.

* * * * *